United States Patent
Binder et al.

(10) Patent No.: US 8,742,703 B2
(45) Date of Patent: Jun. 3, 2014

(54) BLOWER APPARATUS HAVING AN ELECTRIC DRIVE MOTOR

(75) Inventors: Andreas Binder, Stuttgart (DE); Arne Untermann, Remshalden (DE); René Wichert, Durlangen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 228 days.

(21) Appl. No.: 13/326,649

(22) Filed: Dec. 15, 2011

(65) Prior Publication Data

US 2012/0153876 A1    Jun. 21, 2012

(30) Foreign Application Priority Data

Dec. 16, 2010    (DE) .......................... 10 2010 054 841

(51) Int. Cl.
*H02P 3/00*    (2006.01)
*H02P 3/12*    (2006.01)

(52) U.S. Cl.
USPC ............ 318/362; 318/139; 318/374; 318/364

(58) Field of Classification Search
USPC .......... 318/139, 440, 374, 362; 320/116, 126, 320/135, 114; 173/213, 217
See application file for complete search history.

(56) References Cited

U.S. PATENT DOCUMENTS

| | | | | |
|---|---|---|---|---|
| 4,144,482 | A | * | 3/1979 | Schwab ........................ 318/381 |
| 5,449,275 | A | * | 9/1995 | Gluszek et al. .................. 417/14 |
| 5,461,368 | A | * | 10/1995 | Comer ........................... 340/607 |
| 5,682,089 | A | * | 10/1997 | Bolte et al. ............... 318/400.09 |
| 6,741,050 | B2 | * | 5/2004 | Wissmach et al. ............ 318/362 |
| 7,761,954 | B2 | * | 7/2010 | Ziegler et al. .................... 15/320 |
| 8,387,193 | B2 | * | 3/2013 | Ziegler et al. .................. 15/50.1 |
| 2008/0284363 | A1 | * | 11/2008 | Lucas et al. .................... 318/441 |
| 2008/0297086 | A1 | * | 12/2008 | Han et al. ....................... 318/441 |
| 2008/0297101 | A1 | * | 12/2008 | Yoo et al. ....................... 318/803 |
| 2009/0282642 | A1 | * | 11/2009 | Batchelder et al. ............. 15/405 |
| 2010/0275405 | A1 | * | 11/2010 | Morse et al. .................... 15/319 |

* cited by examiner

*Primary Examiner* — Rita Leykin
(74) *Attorney, Agent, or Firm* — Walter Ottesen P.A.

(57) ABSTRACT

The invention relates to a blower apparatus (1) having a blower wheel (4) for generating a blower air flow (50). The blower wheel (4) is arranged in a housing (2), wherein the blower wheel is driven by an electric drive motor (8). A blower tube (6) via which the generated blower air flow (50) is guided connects at an outlet (5). A control unit (17) is provided for controlling the rotational speed of the electric drive motor. For a quick reduction of the blower air flow (50), it is provided that the control unit (17) supports the deceleration of the drive motor (8) through a braking current (I).

18 Claims, 3 Drawing Sheets

BLOWER APPARATUS HAVING AN ELECTRIC DRIVE MOTOR

CROSS REFERENCE TO RELATED APPLICATION

This application claims priority of German patent application no. 10 2010 054 841.3, filed Dec. 16, 2010, the entire content of which is incorporated herein by reference.

FIELD OF THE INVENTION

The invention relates to a blower apparatus having an electric drive motor.

BACKGROUND OF THE INVENTION

Blower apparatuses having an electric drive motor are generally known. A rotatably mounted blower wheel for generating a blower air stream is arranged in a housing of the blower apparatus. The blower air stream is supplied to a blower tube, which serves the operator in guiding the blower air stream, via an outlet out of the housing. The electric drive motor, which drives the blower wheel and is connected to an energy source via a control unit, is arranged in the housing.

The blower wheel is mounted in the housing with little friction in such a manner that only minimal drive losses occur. Because of the minimal friction and the inertia of the blower wheel and the masses rotating with the blower wheel such as the rotor of the drive motor, overrun times of 3 to 5 seconds occur despite a switching off of the motor. During these 3 to 5 seconds, the blower apparatus still outputs a clearly ascertainable blower air flow which, however, is no longer desired by the user. The persisting blower air flow resulting from the overrun times is disruptive when blowing together leaves or similar lightweight materials.

SUMMARY OF THE INVENTION

It is an object of the invention to configure a blower apparatus having an electric drive motor in such a manner that the volume flow of a blower air flow quickly ceases after the user shuts off the blower apparatus.

The blower apparatus of the invention includes: a housing; a blower wheel arranged in the housing and configured to generate a blower air flow; an outlet for the blower air flow; a blower tube which connects to the outlet; the blower tube being configured for guiding the blower air flow; an electric drive motor arranged in the housing and configured to drive the blower wheel; a voltage source; a control unit configured to control the rotational speed (n) of the drive motor; the drive motor being connected to the voltage source via the control unit; and, the control unit being configured to support a deceleration of the drive motor via a braking current (I) in order to reduce the blower air flow.

The control unit, arranged for the control of the electric drive motor, is configured in such a manner that during the delay of the drive motor for a quick reduction of the blower air flow, the control unit supports the deceleration of the rotating masses through a braking current. The braking current is set by the control unit in such a manner that an effective braking with a significant drop in blower air flow results, so that the user recognizes a prompt drop off of the blower air flow in the sense of "shutting off" the blower air flow.

Surprisingly, it turns out that, in order to achieve a quick drop off of the volume flow to a quasi non-effective residual volume flow, controlling of the braking current in this way is advantageous. As a result of the braking current, when braking from an operating rotational speed to up to less than 10% of the operating rotational speed, the rotational speed profile of the drive motor over time follows a characteristic curve which over more than 60% of the braking time has an essentially even negative slope. If such a dropping rotational speed profile is achieved by the control of the braking current, a quickly subsiding blower air flow results which within a short time comes so far to a standstill that it no longer has any effect on the material blown together. The user can turn the blower air flow on or off quasi on demand.

The setting of the rotational speed profile according to a characteristic curve having an essentially even negative slope also serves to limit the torques occurring in the wrist of the user due to the deceleration when braking to values which the user does not perceive as disrupting.

Advantageously, the controlled braking is done up to a rotational speed of less than 5% of the operating rotational speed. The blower air flow subsides significantly and is thus quasi shut off before the lower limit of less than 5% is reached.

For a quick standstill of the drive motor and the blower wheel rotating therewith, it can be expedient to short circuit the field windings of the drive motor at the end of a braking procedure. Advantageously, the short circuit is achieved via a resistor which, as a braking resistor, limits the current flowing.

The upward slope of the characteristic curve is selected in such a manner that the braking time is approximately 400 to 2,000 milliseconds, preferably approximately 500 to 1,500 milliseconds. The slope of the braking characteristic curve can, thereby, essentially correspond to the starting slope of the rotational speed profile at the beginning of a braking procedure.

Expediently, the characteristic curve of the rotational speed profile of the drive motor is formed in such a manner over time that the negative slope is the same over approximately 80% of the braking time. The negative slope can, thereby, correspond to a rotational speed drop off of approximately 1,000 l/min per 100 milliseconds.

In one embodiment, the rotating component comprising at least a blower wheel and the rotor of the drive motor has a mass moment of inertia in the range of $3 \times 10^5$ to $5 \times 10^5$ g/mm$^2$; advantageously there is a set mass moment of inertia of approximately $4 \times 10^5$ g/mm$^2$.

In an advantageous embodiment of the invention, the energy source is configured as a battery which is in particular configured as a lithium-based single cell. An electronically commutated motor, which in particular is configured as an external rotor, is practical as the electric drive motor. The blower wheel can be directly flanged on the external rotor of the electric drive motor.

The braking current present during a braking procedure is supplied to the battery in a special manner as electrical charging current; a current limiting in dependence on the operating data of the battery cells is advantageous.

The control unit for setting the electrical braking current is advantageously an electronic control unit which enables a quick reaction to changes in operating conditions during a braking procedure. Thus, the desired characteristic curve can be securely maintained without relatively large deviations. Expediently, the control unit includes a microprocessor for quick calculation of the parameters to be set for a braking procedure.

Advantageously, the braking current is limited to a value which is determined by a maximum allowable torque on the housing of the blower apparatus. This value can be determined by the force which the user must exert to counter the braking torque when holding the blower apparatus by a handle so that the blower apparatus does not change its position.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
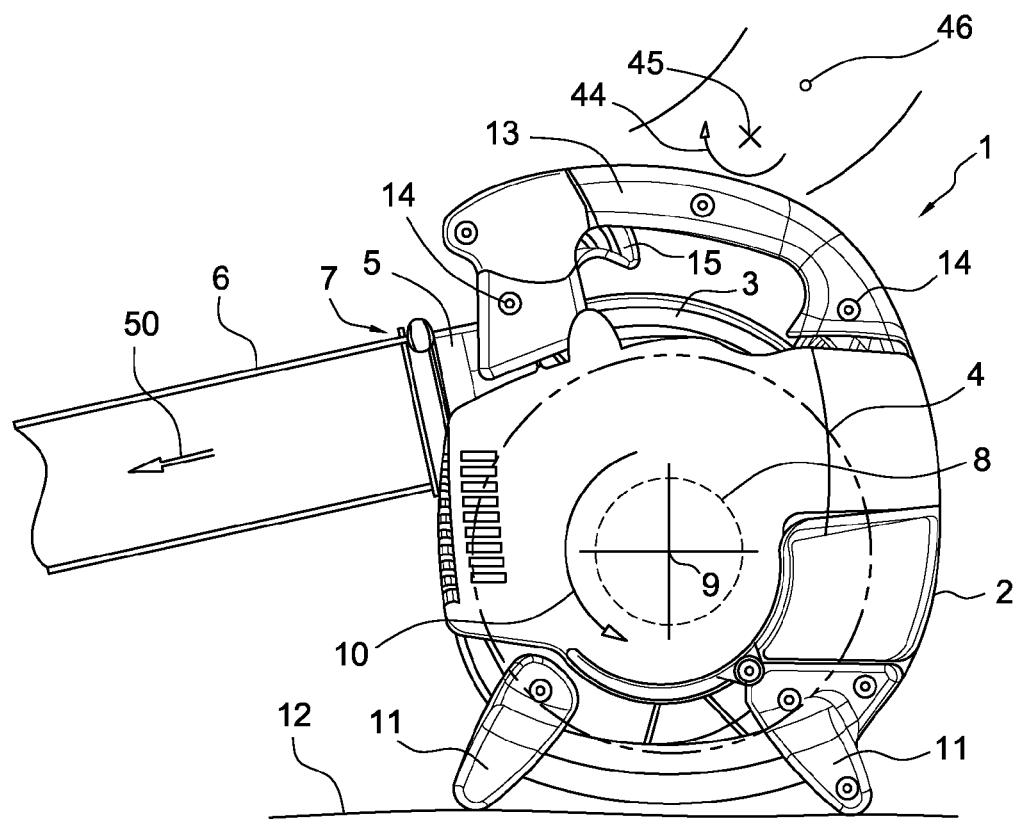
FIG. 1 is a schematic side view of a blower apparatus having an electric drive motor.

The blower apparatus 1 shown in FIG. 1 has a housing 2 having a blower scroll 3 in which a blower wheel 4 runs. The blower scroll 3 has an outlet 5 to which a blower tube 6 connects. The blower tube 6 can be configured as a separate component and be fixed on the outlet 5 via a connector 7; it can also be advantageous to configure the blower tube 6 in one piece with the housing 2 of the blower apparatus 1.

An electric drive motor 8, which drives the blower wheel 4 about a rotational axis 9 in the direction of the arrow 10, is mounted in the housing 2.

In the shown embodiment, the housing 2 of the blower apparatus 1 has stand feet 11 with which it can be placed on the ground 12.

A handle 13, which is expediently connected with the housing 2 at both ends via anti-vibration elements 14, is fixed in the upper area of the blower apparatus 1 which is the opposite side of the housing 2 relative to the stand feet 11. On the inner side of the handle 13 which faces the housing 2, an operating element in the form of a rotational speed setter 15 is provided. The rotational speed setter 15 is configured similarly to a throttle lever.

An energy source 19, which is preferably configured as a battery 20 having an output voltage, is provided—preferably in a manner integrated in the housing—for the electrical energy supply of the drive motor 8. The battery 20 is comprised of a plurality of individual cells 21 which, in particular, are lithium-based individual cells. Thus, the individual cells can be lithium-ion, lithium-polymer, lithium-metal or similar cells.

The electric drive motor 8 preferably is an electronically commutated motor which is, in particular, configured as an external rotor. The field windings of the stator 18 are connected with the energy source 19 via a control unit 17. The rotor 16 of the electric drive motor 8 surrounds the stator 18; the rotor 16 is connected to the blower wheel 4 in a rotatably fixed manner so as to cause the blower wheel to rotate with the rotor. The control unit 17 advantageously is an electronic control unit and includes a microprocessor 27.

The rotational speed setter 15 arranged in the handle 13 in the form of a throttle trigger is connected to the control unit 17 via a control line 22. The control of the rotational field of the electric drive motor is done by the control unit 17 in dependence on the pivot motion of the rotational speed setter in the direction of arrow 23, so that, in dependence on the position of the rotational speed setter 15, the electric drive motor 8 and thus the blower wheel 4 are driven with corresponding rotational speed. If the rotational speed setter 15 is fully pushed down, the drive motor 8 runs with a nominal rotational speed; if the user releases the rotational speed setter 15, the rotational speed of the drive motor 8 is reduced to zero. The drive motor 8 and the blower wheel 4 are at standstill.

During usage, the user carries the blower apparatus 1 by a handle 13 and controls the rotational speed of the electric drive motor 8 and thus the volume flow of the blower air flow 50 with the rotational speed setter 15.

Figure 4:
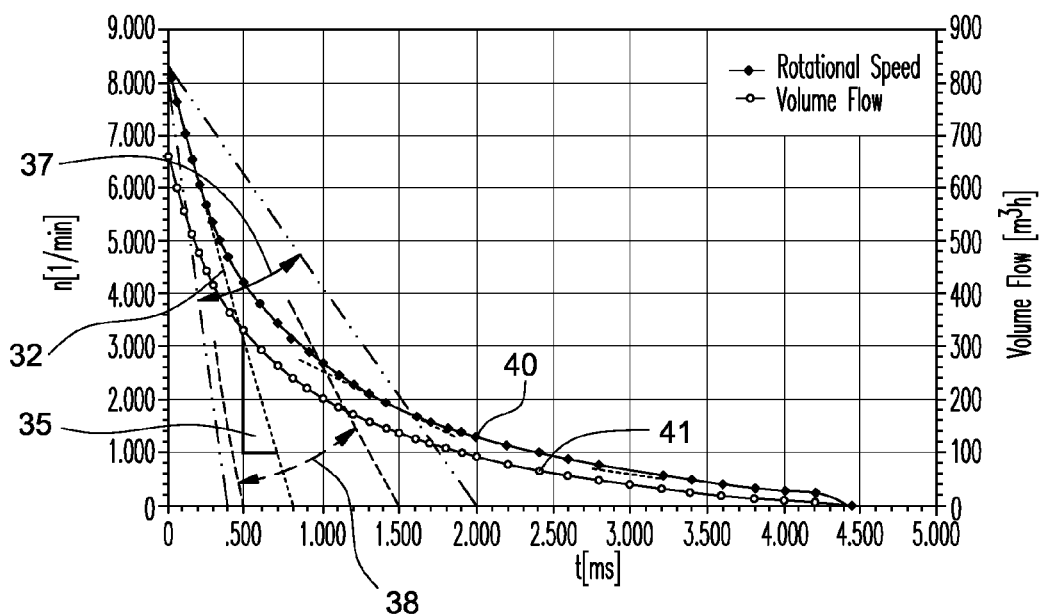
FIG. 4 shows the profile of the rotational speed of the drive motor as a function of time according to the prior art.

While working, it is time and again necessary to "turn off" the blower air flow, for which purpose the user releases the pressed-in rotational speed setter 15 so that it returns to its zero position corresponding to the direction of the arrow 23. Because of the masses of rotor 16 and blower wheel 4, for example, rotating at the nominal rotational speed of 8,000 revolutions per minute, an overrun time (shown in FIG. 4) results if there is no braking. With the release of the rotational speed setter 15 at a nominal rotational speed of approximately 8,000 revolutions per minute, about 4,500 milliseconds elapse before the rotational speed (n) drops to zero. The rotational speed characteristic curve is the top characteristic curve 40 shown in FIG. 4, while the volume flow of the blower air flow—given in cubic meters per hour—is shown as the lower characteristic curve 41. The characteristic curves 40 and 41 have an approximately identical exponential profile and drop toward zero with a changing slope.

In order to ensure a quicker subsiding of the blower air flow 50, a braking current I is set by the control unit 17 in the stator 18, whereby a quicker braking of the electric motor as well as the blower wheel 4 is achieved. Thereby, according to the invention, the braking current I is set by the control unit 17 in such a manner that the rotational speed profile 33 of the drive motor 8 over time follows a characteristic curve 30 according to FIG. 3, which has an essentially even negative slope over more than 60% of a braking time B. In other words, as a result of the control of the braking current I, a rotational speed profile 33 of the rotational speed (n) of the drive motor 8 over the time (t) will follow the characteristic curve 30, which has an essentially even negative slope 35 over more than 60% of the braking time B. As a result of this control of the braking current I, the volume flow of the blower air flow 50 steadily declines linearly whereby the blower air flow 50 can be controlled well by the user.

The braking time B is the time in which the rotational speed (n) drops from an operating rotational speed—in the shown embodiment the nominal rotational speed of 8,000 l/min—to less than 10% of the operating rotational speed—in the shown embodiment 800 l/min. In a range of approximately 800 to 1,500 l/min, the volume flow is so small that it is not perceived as disruptive by the user when using the apparatus. It is thus sufficient if a quick braking of the drive motor 8 to a low rotational speed occurs, which approximately corresponds to 10%, preferably less than 5%, of the operating rotational speed. This rotational speed change Δn occurs over a time period (t) of approximately 400 to 2000 milliseconds, whereby an array of curves of possible braking times result in the region 37. Preferably, a braking time in the narrower limits of, for example, 500 to 1,500 milliseconds is strived for, which leads to an array of curves in the region 38.

In an advantageous embodiment of the invention, the slope 35 of the characteristic curve of the rotational speed profile 33 of the drive motor 8 over time corresponds to the beginning slope 36 of the characteristic curve 30 at the beginning of the braking procedure.

The same negative slope 35 is maintained over a partial braking time T of more than 60%; this partial braking time with the same negative slope can be the same up to over approximately 80% of the braking time B.

Figure 2:
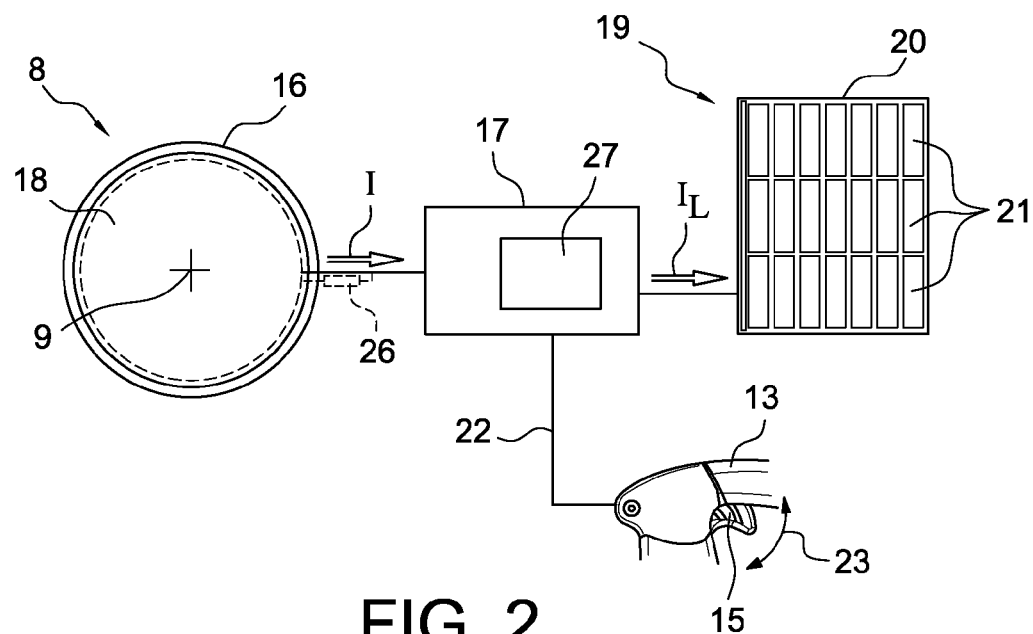
FIG. 2 is schematic diagram of the electric circuit for operating the electric drive motor.

If less than 10% of the operating rotational speed is reached when braking, it can be expedient to electrically short circuit the drive motor 8. For this, the phase connections of the still rotating electrical motor are connected to each other so that a braking current which delays the rotor is generated on the basis of the induced voltages of the rotating rotor. In order to limit the braking current, a braking resistor 26 can be connected into the short-circuited field windings of the stator 18 (FIG. 2). Such a braking arrangement can, in simply configured work apparatuses with an electric drive motor, be switched-in over the entire braking time. In an exemplary embodiment, at the end S of a braking procedure controlled by the control unit 17, the drive motor 8 runs with short-circuited field windings or with field windings, which are connected to a braking resistor, until reaching standstill.

Figure 3:
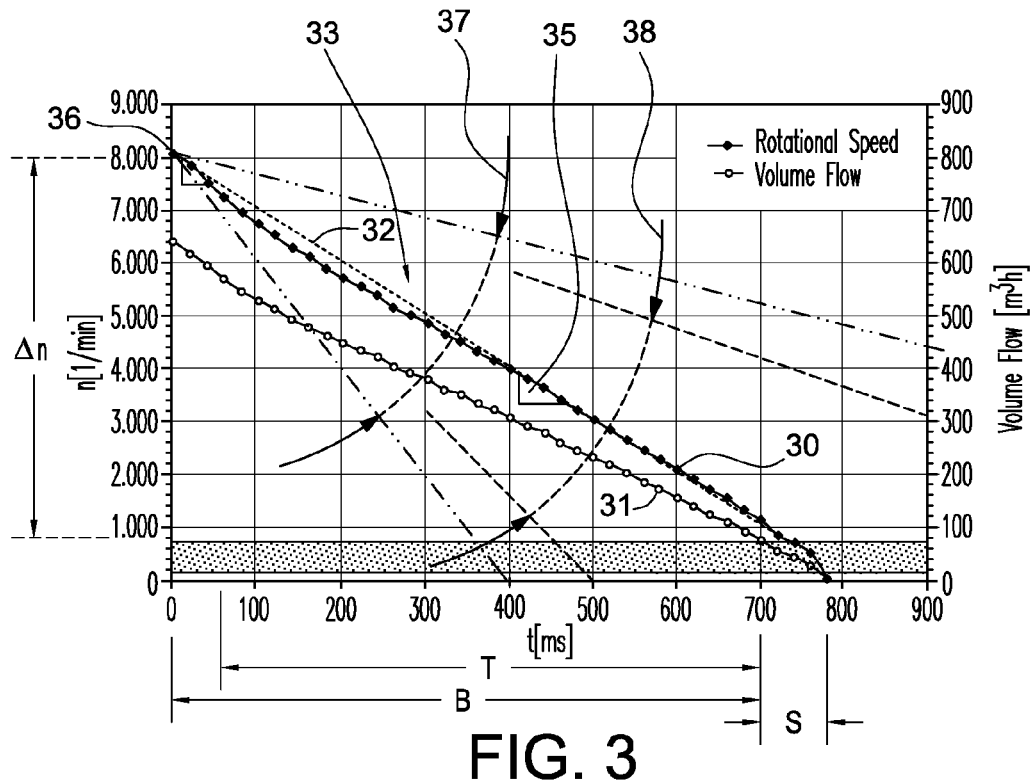
FIG. 3 shows a graph of the profile of the rotational speed of the drive motor as a function of time while braking.

In FIG. 3, a characteristic curve 31 of the rotational speed profile is shown using dotted lines whose negative slope 35 corresponds approximately to a rotational speed drop off of 1,000 l/min per 100 milliseconds.

The braking times given in the shown exemplary embodiment are achieved in a blower apparatus whose rotating masses have a mass moment of inertia in the range of $3 \times 10^5$ to $5 \times 10^5$ g/mm$^2$. In particular, the rotating masses comprising at least a blower wheel 4 and the rotor 16 of the driving electric motor 8 have a mass moment of inertia of approximately $4 \times 10^5$ g/mm$^2$.

The braking current I set by the control unit 17 is preferably supplied to the battery 20 as an electrical charging current $I_L$. The currents induced during a braking procedure thus serve to charge the individual cells 21 of the battery 20, whereby energy is recovered. The charging current $I_L$ should not be allowed to increase to over 8 amperes. As a result of the charging of the battery during the braking operation of the blower apparatus, the total operating time of the blower apparatus having an electric drive motor can be improved.

The controlling of the braking current I is also dependent on the condition that the torque 44 occurring in the wrist 45 of the user as a result of the braking does not become too great. In FIG. 1, the arm 46 of a user and the user's wrist 45 are schematically indicated.

Figure 5:
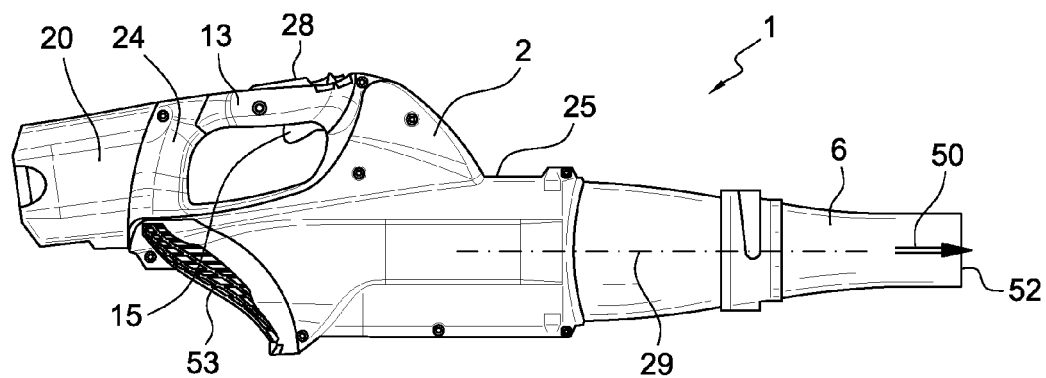
FIG. 5 is a side view of an axial blower apparatus having an electric drive motor; and, FIG. 6 is a schematic section through the axial blower apparatus of FIG. 5.
Figure 6:
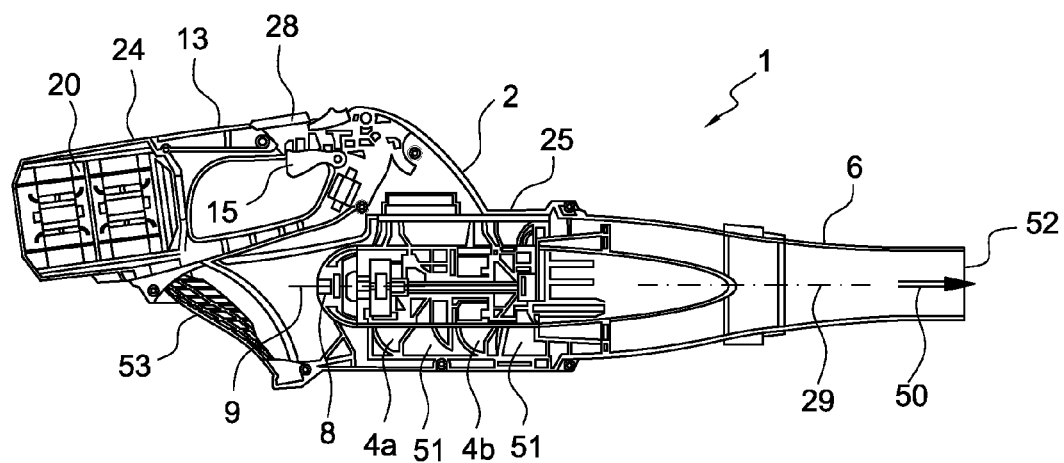

The exemplary embodiment according to FIGS. 5 and 6 shows a blower apparatus 1 which is configured as an axial blower apparatus 25. The blower apparatus 1 includes an elongated housing 2, which at the front end carries a blower tube 6 and at the back end a receptacle 24 for a battery 20 which is to be inserted. Between the receptacle 24 and the housing 2, a handle 13 is provided, on which a rotational speed setter 15 in the form of a throttle trigger is provided on the inner side which faces the housing 2. The rotational speed setter 15 is blocked by a latch 28. Only after the latch 28 is pushed down can the rotational speed setter be actuated.

As shown in FIG. 6, the electric drive motor 8 is arranged in the housing 2 below the handle 13. The rotational axis 9 of the electric drive motor 8 is approximately coincident with the longitudinal center axis 29 of the axial blower apparatus 25. The rotor of the electric motor 8 drives two blower wheels 4a and 4b which lie axially one behind the other. The two blower wheels 4a and 4b each have an air guide wheel 51 associated therewith.

The blower air flow 50 exits the housing 2 at the outlet opening 52; on the opposite front end of the elongated housing 2 lies an air intake window 53 which is covered by a grid.

The control unit 17 preferably lies in the housing 2 close to the electric drive motor 8 and controls the electric motor according to the schematic illustration of FIG. 2. The braking procedure which results when the rotational speed setter 15 is released follows the characteristic curve 30 as is shown in FIG. 3.

The energy source can be configured as a voltage source or a current source, whereby a fixed output voltage or a fixed output current can be set.

It is understood that the foregoing description is that of the preferred embodiments of the invention and that various changes and modifications may be made thereto without departing from the spirit and scope of the invention as defined in the appended claims.

What is claimed is:

1. A blower apparatus comprising:
a housing;
a blower wheel arranged in said housing and configured to generate a blower air flow;
an outlet for said blower air flow;
a blower tube which connects to said outlet;
said blower tube being configured for guiding said blower air flow;
an electric drive motor arranged in said housing and configured to drive said blower wheel;
a voltage source;
a control unit configured to control the rotational speed (n) of said drive motor;
said drive motor being connected to said voltage source via said control unit;
said control unit being configured to support a deceleration of said drive motor via a braking current (I) in order to reduce said blower air flow; and,
said control unit being configured to set said braking current (I) in such a manner that on the basis of a braking time (B), a braking procedure of an operating rotational speed (n) to less than 10% of the operating rotational speed follows a rotational speed course of said drive motor which follows a characteristic line as a function of time (t) which has an essentially constant negative slope over more than 60% of said braking time (B).

2. The blower apparatus of claim 1, wherein said braking procedure is controlled to slow down to a rotational speed (n) of less than 5% of said operating rotational speed (n).

3. The blower apparatus of claim 2, wherein said drive motor is configured to be short circuited at the end (S) of said braking procedure until said drive motor is at standstill.

4. The blower apparatus of claim 3, wherein said drive motor is short circuited via a resistor.

5. The blower apparatus of claim 1, wherein said braking time (B) is 400 to 2000 milliseconds.

6. The blower apparatus of claim 5, wherein said braking time (B) is 500 to 1500 milliseconds.

7. The blower apparatus of claim 1, wherein said slope corresponds to the initial slope of said rotational speed course at the beginning of a braking procedure.

8. The blower apparatus of claim 1, wherein said negative slope is the same over approximately 80% of said braking time (B).

9. The blower apparatus of claim 1, wherein said negative slope corresponds to a rotational speed drop of approximately 1000 l/min per 100 milliseconds.

10. The blower apparatus of claim 1 further comprising:
said drive motor including a rotor;

at least said rotor and said blower wheel conjointly defining a rotating component;

said rotating component having a mass moment of inertia of $3\times10^5$ to $5\times10^5$ g/mm².

11. The blower apparatus of claim 10, wherein said mass moment of inertia is approximately in the region of $4\times10^5$ g/mm².

12. The blower apparatus of claim 1, wherein said voltage source is a battery.

13. The blower apparatus of claim 1, wherein said voltage source is a battery made up of individual cells based on lithium.

14. The blower apparatus of claim 12, wherein said braking current (I) is supplied to said battery in the form of an electric charging current ($I_L$).

15. The blower apparatus of claim 1, wherein said drive motor is an electronically commutated motor.

16. The blower apparatus of claim 15, wherein said motor is an external rotor motor.

17. The blower apparatus of claim 1, wherein said control unit is an electronic control unit and includes a microprocessor.

18. The blower apparatus of claim 1, wherein said braking current (I) is limited to a value which is determined by a maximum permitted torque on said housing of said blower apparatus.

* * * * *